United States Patent [19]

Eikhenbaum

[11] Patent Number: 5,418,274
[45] Date of Patent: May 23, 1995

[54] HEAT-RESISTANT UNIT

[75] Inventor: Irina G. Eikhenbaum, Rostov-na-Donu, Russian Federation

[73] Assignee: Brokerskaya firma "Tsezar", Rostov-na-Donu, Russian Federation

[21] Appl. No.: 147,676

[22] Filed: Nov. 4, 1993

[30] Foreign Application Priority Data

Jan. 14, 1993 [RU] Russian Federation .... 93-002754/05

[51] Int. Cl.$^6$ .............................................. C08K 3/02
[52] U.S. Cl. .................................. 524/437; 524/493; 524/506
[58] Field of Search ................... 524/437, 506, 493

[56] References Cited

U.S. PATENT DOCUMENTS

| | | | |
|---|---|---|---|
| 3,932,347 | 1/1976 | Camelon et al. | 524/379 |
| 4,714,801 | 12/1987 | Koblitz et al. | 524/319 |
| 5,087,656 | 2/1992 | Yoshinaga et al. | 524/493 |

FOREIGN PATENT DOCUMENTS

| | | | |
|---|---|---|---|
| 0202178 | 12/1988 | European Pat. Off. | |
| 523527 | 1/1993 | European Pat. Off. | 524/506 |
| 56-116739 | 9/1981 | Japan | 524/506 |
| 3-252414 | 11/1991 | Japan | 524/506 |

*Primary Examiner*—John C. Bleutge
*Assistant Examiner*—Mark Sweet
*Attorney, Agent, or Firm*—Collard & Roe

[57] ABSTRACT

A paint used as a corrosion-protective coating of products and structures of ferrous and non-ferrous metals adapted to operated in a temperature range of from minus 40° C. to plus 550° C. to 600° C. The paint comprises (in weight %): direct-synthesis butanolized polyphenylsiloxane resin, 20–22; aluminum powder, 12–18; aerosil (pure silicon dioxide), 3–7; a copolymer of methylmethacrylate and methacrylic acid, 13–29; and solvent, 36–40.

3 Claims, No Drawings

HEAT-RESISTANT UNIT

FIELD OF THE INVENTION

The present invention relates to paint materials based on silicone resins and is concerned more specifically to a heat-resistant paint.

The present invention can find most utility when applied for corrosion-protection of products and structures made of ferrous and nonferrous metals and aimed at operating in the temperature range of from minus 40° to plus 550° C.

BACKGROUND OF THE INVENTION

Known in the present state of the art are heat-resistant paints based on silicone compounds (polymethylsiloxanes, polymethylphenylsiloxanes, and polyethylphenylsiloxanes). The operating temperature of products or structures to which coatings based on said paints are applied is not, however, to exceed 400° C. In addition, said coatings are capable of curing (that is, forming a three-dimensional structure) at as high temperature as 200°–300° C.

Another heat-resistant paint (EP, B, 0202178) is known to be based on methylphenylsiloxane resin, comprising silicon dioxide, aerosil, and powdered aluminium. The coating based on said paint is heat-resistant and preserves its physical properties at a temperature up to 250° C.

Said paint is disadvantageous in using methylphenylsiloxane resin as a film-forming agent, which fails to establish a reliable cross-linked structure at a temperature of plus 150°–250° C. and is liable to destruct at temperatures above plus 250° C. Moreover, such a coating is dried only at an elevated temperature (above 100° C.).

One more disadvantage of said known paint resides in that it contains up to 25% of aerosil which badly thickens the composition, thus depriving it of fluidity and hence of a possibility of being spray-or electrolytically deposited. This in turn deprives aluminium powder of its intrinsic metallic lustre, which is causative of a dull-gray color of the coating.

OBJECTS AND SUMMARY OF THE INVENTION

It is an object of the present invention to extend the temperature range of operation of the proposed paintwork from minus 40° C. to plus 550°–600° C.

It is another object of the present invention to prolong the service life of products and structures coated with the paintwork based on the proposed paint.

The foregoing and further objects are accomplished due to the fact that a heat-resistant paint, incorporating a silicone resin, powdered aluminium, and aerosil (pure silicon dioxide), according to the invention, contains additionally a copolymer of methylmethacrylate and methacrylic acid, and a solvent, while used as said silicone resin is a direct-synthesis butanolized polyphenylsiloxane resin, the ratio between said components being as follows (wt.%):

| | |
|---|---|
| polyphenylsiloxane resin | 20–22 |
| copolymer of methylmethacrylate and methacrylic acid | 13–29 |
| aerosil (pure silicon dioxide) | 3–7 |
| aluminium powder | 12–18 |
| solvent | 36–40 |

A combination of butanolized polyphenylsiloxane resin with copolymer of methylmethacrylate and methacrylic acid (modifier) makes possible the proceeding of natural pseudodrying and forming of a three-dimensional (cross-linked) structure of the coating at 100°–130° C. The thus-found ratio between both of the principal paint components not only contributes to realization of the abovestated properties but also enables one to use the film-forming properties of both principal components, i.e., silicone resin and acrylic modifier during natural drying. An optimum aerosil concentration makes it possible to attain sedimentation stability of the paint and to retain the silvery lustre characteristic of an aluminium pigment and appearing in the coatings. The aforestated ratio between the aluminium powder and aerosil in combination with the film-forming properties make it possible to obtain a protective-decorative coating of metals operable in the temperature range of from minus 40° to plus 500°–600° C.

Provision of a solvent in the abovesaid formulation makes the paint applicable without thinning. To obtain paints having high electrical volume resistivity values (for application to intricately shaped products by the electrolytic deposition technique) the paint may feature a 100% thinning with the solvent.

BRIEF DESCRIPTION OF THE EMBODIMENTS

The process for producing the herein-proposed heat-resistant paint is technologically simple and is carried into effect as follows.

Polyphenylsiloxane resin is charged into a dissolver and the stirrer is turned on. Thereupon a copolymer of methylmethacrylate and methacrylic acid, and the solvent are added. The contents of the dissolver are thoroughly stirred for 15 min, after which aerosil is added at a slow rate, and the mixture is stirred for another 40 min until aerosil swells, after which aluminium powder is added at a slow rate, and all the aforementioned components are stirred for 30 min, after which the paint is ready for use and is prepacked in containers. The paint is applied to a preliminarily cleaned and degreased metal surface by electrolytical-deposition, spray-deposition, or by brushing in a single of two layers depending on specific operating conditions.

Used as the principal heat-resistant film-forming agent is a direct-synthesis polyphenylsiloxane resin butanolized with isobutanol and having a general formula

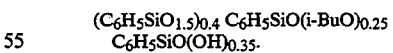

$(C_6H_5SiO_{1.5})_{0.4}\ C_6H_5SiO(i\text{-}BuO)_{0.25}$
$C_6H_5SiO(OH)_{0.35}.$ The resin per se is of no use since it does not cure at both a natural temperature and at elevated ones (150°–300° C.) at which other silicone resins used as film-forming agents for paint materials are capable of curing without any modifiers.

Used commonly as modifiers in silicone-based paint materials to provide for cold pseudo-drying and promoting hot drying to establish a three-dimensional paintwork are copolymers of butylacrylate and methacrylic acid featuring the percentage content of said acid from 3.9 to 4.7% and having a molecular weight of 40000–100,000.

No data on use of copolymers of methylmethacrylate and methacrylic acid as modifiers have been found in the literature by the inventor. The molecular weight of the copolymer is equal to 25000–75000 (up to 100000), the weight percentage of methacrylic acid is 3.5–4.5%.

The term "solvent" implies, according to the inventor, petroleum fractions or the products of refining the fractions of crude benzene and those of pyrolysis of petroleum resin or coal tar having the fractionation temperature of 110°/195° C.

To promote understanding of the present invention given below are exemplary specific ratios of components of the proposed paint which are tabulated in Table 1 below.

TABLE 1

| Nos | Components | Paint content (wt. %) | | | | | |
|---|---|---|---|---|---|---|---|
| 1 | 2 | 1 / 3 | 2 / 4 | 3 / 5 | 4 / 6 | 5 / 7 | 6 / 8 |
| 1 | Polyphenylsiloxane resin | 20 | 20 | 21 | 18 | 21 | 21 |
| 2 | Copolymer of methylmethacrylate and methacrylic acid | 19 | 29 | 21 | 29 | 15 | 26 |
| 3 | Aerosil | 6 | 3 | 5 | 5 | 5 | 5 |
| 4 | Aluminium powder | 15 | 12 | 15 | 12 | 20 | 10 |
| 5 | Solvent | 40 | 36 | 38 | 36 | 39 | 38 |

TABLE 1-continued

| Nos | Components | Paint content (wt. %) | | | | | | |
|---|---|---|---|---|---|---|---|---|
| 1 | 9 | 7 / 10 | 8 / 11 | 9 / 12 | 10 / 13 | 11 / 14 | 12 / 15 | 13 / 16 |
| 1 | Polyphenylsiloxane resin | 25 | 22 | 20 | 22 | 20 | 22 | 21 |
| 2 | Copolymer of methylmethacrylate and methacrylic acid | 15 | 11 | 30 | 25 | 20 | 29 | 17 |
| 3 | Aerosil | 7 | 7 | 3 | 2 | 9 | 3 | 3 |
| 4 | Aluminium powder | 17 | 18 | 12 | 12 | 12 | 12 | 15 |
| 5 | Solvent | 36 | 42 | 35 | 39 | 39 | 34 | 44 |

Table 2 contains the results of testing the coatings established by the proposed paint featuring the various ratios of components thereof. As can be seen from the data contained in Table 2 the optimum paint compositions (formulations) are Nos 1–3 containing (wt. %) 20–22 of polyphenylsiloxane resin, 13–29 of copolymer of methylmethacrylate and methacrylic acid, 3–7 of aerosil, 12–18 of aluminium powder, and 36–40 of solvent.

TABLE 2

| Nos | Characteristics | Units of measurement | Formulations of the proposed paint | | | | | |
|---|---|---|---|---|---|---|---|---|
| 1 | 2 | 3 | 1 / 4 | 2 / 5 | 3 / 6 | 4 / 7 | 5 / 8 | 6 / 9 |
| 1 | Resistance of coating to variable temperature effect | | | | | | | |
| 2 | +550° C. - water hardening −40° C. - +550° C. | cycles cycles | 15 10 | 15 10 | 15 10 | 3 2 | 15 10 | 10 8 |
| 3 | Resistance of coating to temperature of +600° C. | hour | 8 | 8 | 8 | does not stand | 8 | does not stand |
| 4 | +700° C. | hour | 1 | 1 | 1 | does not stand | 1 | does not stand |
| 5 | Paint delamination for 24 hours | millimetres | 5 | 1 | 3 | 1 | 12 high-rate sedimentation of aluminium powder | 1 |

| | Formulations of the proposed paint | | | | | | |
|---|---|---|---|---|---|---|---|
| Nos 1 | 7 / 10 | 8 / 11 | 9 / 12 | 10 / 13 | 11 / 14 | 12 / 15 | 13 / 16 |
| 1 | 12 8 | 6 4 | 4 3 | 9 5 | 15 10 | 4 4 | 4 5 |
| 2 | | | | | | | |
| 3 | 6 | does not stand | does not stand | 6 | 8 | 4 | 4 |
| 4 | does not | does not stand | does not stand | does not stand | does not stand | does not stand | does not stand |
| 5 | 2 | 3 | 2 | 13 high-rate sedimentation of aluminium powder | 0.2 higher viscosity | 2 | 6 |

The abovementioned paint compositions stand 15 cycles of water hardening at plus 550° C., upward 10 cycles of variable temperature effect within the range of from minus 40° to plus 550° C., 8-hours exposure to a temperature of +600° C. and one-hour exposure to a temperature of +700° C. without any change in the appearance and quality of the coating.

In all examples cited above the thickness of the dried coating is 20-30 m.

Tests of the coating for resistance to variable temperature effect demonstrate also that the paint polyphenylsiloxane resin content below 20% (formulation 4) results in peeling of the coating after 2 or 3 cycles. When said content exceeds 22% (formulation 7), the coating develops cracks after 12 cycles of water hardening, and at a temperature of −600° C. (exposure time 6 hours), and after 8 cycles of variable temperature effect in the range of from minus 40° C. and plus 550° C., the coating gets distored.

An optimum content of the copolymer of methylmechacrylate and methacrylic acid of the proposed paint is within 13 and 19%, and that of the solvent, within 36 and 40%. Both their higher content (formulations 9 and 13) and a lower content of said components (formulations 8 and 12) result, after 3–6 cycles of variable temperature effect, in peeling of the coating.

When the solvent content of the paint is other than 36–40% (formulations 12, 13), the coating is found to peel off after having been exposed at a temperature of +600° C. for 4 hours.

Slight peeling of the coating is observed after 5–9 cycles of the variable temperature effect when the aerosil content of the paint is less than 3% (formulation 10), as well as distortion after a six-hour exposure to a temperature of +600° C. On the other hand, the aerosil content above 7% (formulation (11) increases paint viscosity which results in technological difficulties when preparing the paint having the necessary parameters. In addition, the coating is liable to peel off after having been exposed to a temperature of +600° C., whereas the coating remains unaffected as to its external appearance and quality after having been exposed to the variable temperature effect.

The coating remains unaffected when the paint aluminium powder content exceeds the upper limit (formulation 5) and the coating is exposed to the variable temperature effect. But a higher content of aluminium powder along with a reduced aerosil content (formulation 10) leads to a reduced sedimentation stability (thus, a higher-rate sedimentation of aluminium powder is observed.

The aluminium powder content below 12% (formulation 6) leads to peeling of the coating after 10 cycles of water hardening at a temperature of +550° C. upward, to cracks of the coating after 8 cycles of the variable temperature effect in the range of from minus 40° to 550° C., whereas the temperatures of +600° and +700° C. are not withstood by this coating whatever. The temperature of +700° C. is not withstood by the coatings based on formulations 4, 6–13, and a temperature of +600° C., by the coatings based on formulations 4, 6, 8, 9.

Apart from the advantages stated before the proposed heat-resistant paint is dispensed in a single package, is subjected, depending on operating conditions, to cold or hot drying, develops a fancy silvery decorative coating when subjected to natural drying, and a decorative heat-resistant coating, when hot-dried.

Use of the present paint makes it possible to dispense with priming of the surfaces to be protected using other paint materials. The paint is available from the manufacturer with working painting parameters, can be applied by any techniques (that is, by a brush, roller, or paint-sprayer). High volume resistivity values (2 $10^7$–3 $10^8$ Ohm cm) enables it to be applied by the electrolytical deposition upon products of any size and configuration.

10–15 min after paint application the product surface to be protected acquires a fancy appearance and can be operated without being subjected to considerable mechanical load (e.g., the hot-water or stream-water heating pipes can be painted in the summer-time, whereas a complete curing of the paintwork occurs during winter (operating) period upon supplying of stream or hot water to the pipes). Formation of a three-dimensional (cross-linked) structure of the paintwork can also occur immediately on the painted surface of engines and all piping and tubing of transportation vehicles during their operation.

What we claim is:

1. A heat-resistant paint, comprising from 20 to 22% by weight of polyphenylsiloxane resin of the following formula:

$$(C_6H_5SiO_{1.5})_{0.4}C_6H_5SiO(i-BuO)_{0.25}C_6H_5SiO(OH)_{0.35};$$

from 13 to 29% by weight of a copolymer of methylmethacrylate with methacrylic acid which has a molecular weight of from 25,000 to 100,000, a methacrylic acid weight percentage of from 3.5% to 4.5%;
   from 3 to 7% by weight of silicon dioxide;
   from 12 to 18% of aluminum powder; and
   from 36 to 40% by weight of a solvent.

2. A heat-resistant paint according to claim 1, wherein the solvent is a compound selected from the group consisting of petroleum fractions, the products of refining crude benzene, the products of pyrolysis of petroleum resin, and coal tar having a fractionation temperature of 110°/195° C.

3. A heat-resistant paint, comprising from 20 to 22% by weight of direct synthesis butanolized polyphenylsiloxane resin of the following formula:

$$(C_6H_5SiO_{1.5})_{0.4}C_6H_5SiO(i-BuO)_{0.25}C_6H_5SiO(OH)_{0.35};$$

from 13 to 29% by weight of a copolymer of methylmethacrylate with methacrylic acid which has a methacrylic acid weight percentage of from 3.5% to 4.5%;
   from 3 to 7% by weight of silicon dioxide;
   from 12 to 18% of aluminum powder; and
   from 36 to 40% by weight of a solvent.

* * * * *